United States Patent [19]

Machida

[11] Patent Number: 5,007,298
[45] Date of Patent: Apr. 16, 1991

[54] TOROIDAL-TYPE INFINITELY VARIABLE TRANSMISSION

[75] Inventor: Hisashi Machida, Maebashi, Japan

[73] Assignee: Nippon Seiko Kabushiki Kaisha, Tokyo, Japan

[21] Appl. No.: 404,824

[22] Filed: Sep. 8, 1989

[30] Foreign Application Priority Data

Oct. 31, 1988 [JP] Japan .................. 63-275073

[51] Int. Cl.$^5$ .............. F16H 15/08; F16H 13/00
[52] U.S. Cl. ......................... 74/200; 74/201; 74/199; 74/190.5; 475/192
[58] Field of Search ........... 74/201, 200, 199, 190.5, 74/209, 690, 74; 745/192

[56] References Cited

U.S. PATENT DOCUMENTS

| 2,446,409 | 8/1948 | Chilton | 74/208 |
| 3,165,937 | 1/1965 | Tomaszek | 74/190.5 |
| 3,820,408 | 6/1974 | Louis | 74/200 |
| 3,930,415 | 1/1976 | Hoganson | 74/84 R |
| 4,779,880 | 10/1988 | Hyodo | 74/422 |
| 4,934,206 | 6/1990 | Nakano | 74/200 |

FOREIGN PATENT DOCUMENTS

| 0002061 | 1/1987 | Japan | 74/200 |
| 0106456 | 5/1988 | Japan | 74/200 |

Primary Examiner—Allan D. Herrmann
Assistant Examiner—Winnie Yip
Attorney, Agent, or Firm—Basile and Hanlon

[57] ABSTRACT

An input shaft of a toroidal-type infinitely variable transmission is supported at opposite ends by respective bearings which are secured to a housing, and input and output disks and power rollers are mounted at an intermediate portion of the input shaft. The input shaft has a flange at one end which is connected to an engine, and a pressure adjusting Belleville washer is interposed between the inner end face of the flange and the outer end face of the bearing to bias the input shaft in the direction of the engine so that a predetermined pressing force is applied to the input and output disks and the power rollers during a period in which a small input torque is transmitted to the input shaft. As the input torque increases, the input shaft is moved axially together with a loading cam against the spring force of the Belleville washer, and the inner end face of the flange and the outer end face of the bearing directly abut each other so that a required reaction force is obtained. In this case, since a needle-shaped roller bearing is interposed between the inner peripheral surface of the bearing adjacent the flange and the outer peripheral surface of the inmput shaft, the sliding movement of the input shaft in the axial direction encounters a small frictional resistance.

1 Claim, 3 Drawing Sheets

TOROIDAL-TYPE INFINITELY VARIABLE TRANSMISSION

BACKGROUND OF THE INVENTION

1. Field of the Invention

The present invention relates to a toroidal-type infinitely variable transmission used for vehicles, such as automobiles.

2. Description of the Prior Art

A toroidal-type infinitely variable transmission for a fore-engine rear wheel drive car is disclosed, for example, in U.S. Pat. No. 3,299,744.

In this prior art transmission, an input shaft connected to an engine is rotatably supported by a housing through bearings, and an input disk and an output disk are rotatably disposed on the input shaft in successive order. Power rollers are provided between the input disk and the output disk and are rollably in contact therewith. A rotation force of the input shaft is transmitted to the input disk through a cam and sprag device. A Belleville washer is interposed between the input shaft and a shaft bearing provided on a stationary portion which supports the input shaft. The Belleville washer presses the input disk towards the output disk.

However, in the toroidal-type infinitely variable transmission mentioned above, since the input shaft is supported by the shaft bearing which is secured to the housing, in transition from a condition in which the input disk is pressed by the Belleville washer through the input shaft to a condition in which the input disk is pressed by a cam, although the input shaft moves backwardly against a biasing force of the Belleville washer, the backward movement of the input shaft is performed slowly due to a large slide resistance between the input shaft and the shaft bearing. As a result, the action of a pressing force of the cam on the input disk is delayed, and an increase in thrust cam not follow an increase in input torque. Thus, a serious problem is involved in that in the worst case, a slip is caused between the input disk and the power rollers, causing the power transmission function to be lost.

Another toroidal-type infinitely variable transmission for fore-engine front wheel drive cars and two wheelers is generally structured as shown in FIG. 3 because it is impossible to retain a large space for accommodating the transmission.

Specifically, an input shaft 1 whose right end is connected to a rotation drive, such as an engine, through a clutch is rotatably supported at opposite ends by bearings 3 and 4 which are secured to a housing 2. An output disk 5 and an input disk 6 are rotatably disposed with a predetermined interval therebetween on the input shaft 1 from the side of the rotation drive in this order. Power rollers 7 are rollably and tiltably disposed between both of the disks 5 and 6. Further, a pressing mechanism 8 is disposed at one side of the input disk 6 opposite to the output disk 5 so that no slip is caused between the input disk 6 and the power rollers 7 and between the output disk 5 and the power rollers 7.

The pressing mechanism 8 is comprised of a loading nut 9 secured to the input shaft 1, a loading cam 11 opposing the loading nut 9 through a pressure adjusting Belleville washer 10 and serration coupled to the input shaft 1, and a roller 12 interposed between the loading cam 11 and the input disk 6.

During a period in which the input torque transmitted to the input shaft 1 is small, the input disk 6 is pressed against the output disk 5 by the spring force of the pressure adjusting Belleville washer 10, and a predetermined pressing force is exerted between the input disk 6 and the power rollers 7 and between the output disk 5 and the power rollers 7 so that a reduction in the power transmission efficiency due to the slip among these elements is prevented. From this condition, when the input torque is increased and a thrust greater than the spring force of the pressure adjusting Belleville washer 10 is required, the roller 12 rides on cam surfaces formed on opposing surfaces of the input disk 6 and the loading cam 11. As a result, the loading cam 11 moves the serration portion to the left against the pressure adjusting Belleville washer 10 so that the loading cam 11 directly contacts the loading nut 9 to push it to the left. This pressing force is received by the bearing 4 through the input shaft 1, and consequently, a pressing force corresponding to the input torque is exerted to a power transmission portion between the input disk 6 and the power rollers 7.

However, in the prior art toroidal-type infinitely variable transmission described above, since the loading cam is serration coupled with the input shaft, a large frictional force is created against the axial movement of the loading cam. In particular, in a light load transient condition in which a power transmitting condition by the spring force of the pressure adjusting Belleville washer is changed to a power transmitting condition by a cam force by the loading nut, loading cam, and rollers, when the frictional force in the serration coupling is large, an increase in the thrust can not follow an increase in the input torque, and in the worst case, a slip is caused between the input disk and the power rollers resulting in the lost of the power transmission function. This fatal problem has not been solved in the prior art toroidal-type infinitely variable transmission.

In order to solve this unsolved problem, it may be considered to set the spring force of the pressure adjusting Belleville washer at a high level. However, in this case, a frictional force at the bearing receiving the axial force of the input shaft is increased, and this, in turn, lowers the power transmission efficiency and causes a reduction in a service life of the bearing. Thus, this approach is not preferable.

SUMMARY OF THE INVENTION

The present invention was made in view of the unsolved problem in the prior art, and it is an object of the invention to provide a toroidal-type infinitely variable transmission which improves the power transmission efficiency so as to perform smooth powder transmission in a light load transient condition in which a power transmitting condition by the spring force of a pressure adjusting Belleville washer is changed to a power transmitting condition by the cam force by a loading nut, a loading cam, and rollers.

In order to achieve the object, in one aspect of the invention, in a toroidal-type infinitely variable transmission comprising an input shaft having one end connected to a rotation drive, an output disk and an input disk successively disposed on the input shaft from a rotation drive side of the input shaft with a predetermined interval between the input disk and the output disk, power rollers rollably and tiltably disposed between the input disk and the output disk, and a pressing mechanism having a loading cam and disposed on the input shaft at a rear side of the input disk, the improvement in which the pressing mechanism makes the loading cam and the input shaft slidable as a unit in an axial direction, and wherein the transmission comprises a needle-type roller bearing disposed between the input shaft and a bearing receiving an axial force of the input shaft, and a pressure adjusting elastic member interposed between axial opposing surfaces of the bearing and the input shaft.

Furthermore, in the other aspect of the invention, in a toroidal-type infinitely variable transmission comprising an input shaft having one end connected to a rotation drive, an output disk and an input disk successively disposed on the input shaft from a rotation drive side of the input shaft with a predetermined interval between the input disk and the output disk, power rollers rollably and tiltably disposed between the input disk and the output disk, and a pressing mechanism having a loading cam and disposed on the input shaft at a rear side of the input disk, the improvement comprising a ball spline disposed at a joining portion between the input shaft and the loading cam.

In the toroidal-type infinitely variable transmission in the one aspect of the invention, in a condition in which an input torque transmitted to the input shaft is small, an elastic force of the pressure adjusting elastic member interposed between the axial opposing surfaces of the bearing and the input shaft is transmitted to the input disk through the input shaft and the loading cam to thereby generate a predetermined pressing force between the input disk and the power rollers. From this condition, when the input torque is increased and thrust equal to or larger than the elastic force of the pressure adjusting elastic member becomes necessary, the input shaft itself moves together with the loading cam in the axial direction against the elastic force of the pressure adjusting elastic member. As a result, the input shaft and the bearing abut against each other and it is possible to obtain a necessary reaction force. In this case, even when the loading cam is serration coupled, the loading cam does not move slidingly with respect to the input shaft, and thus, a frictional force is not generated at the serration coupling portion. A frictional force is only generated between the input shaft and the needle-shaped roller bearing and it is possible to reduce the frictional force generated in the transmission to a great extent.

Furthermore, in the toroidal-type infinitely variable transmission in the other aspect of the invention, since the loading cam and the input shaft are coupled with each other by a ball spline, a slide frictional force between the loading cam and the input shaft can be reduced to a great extent as compared with the serration coupling.

DESCRIPTION OF THE PREFERRED EMBODIMENTS

Figure 1:
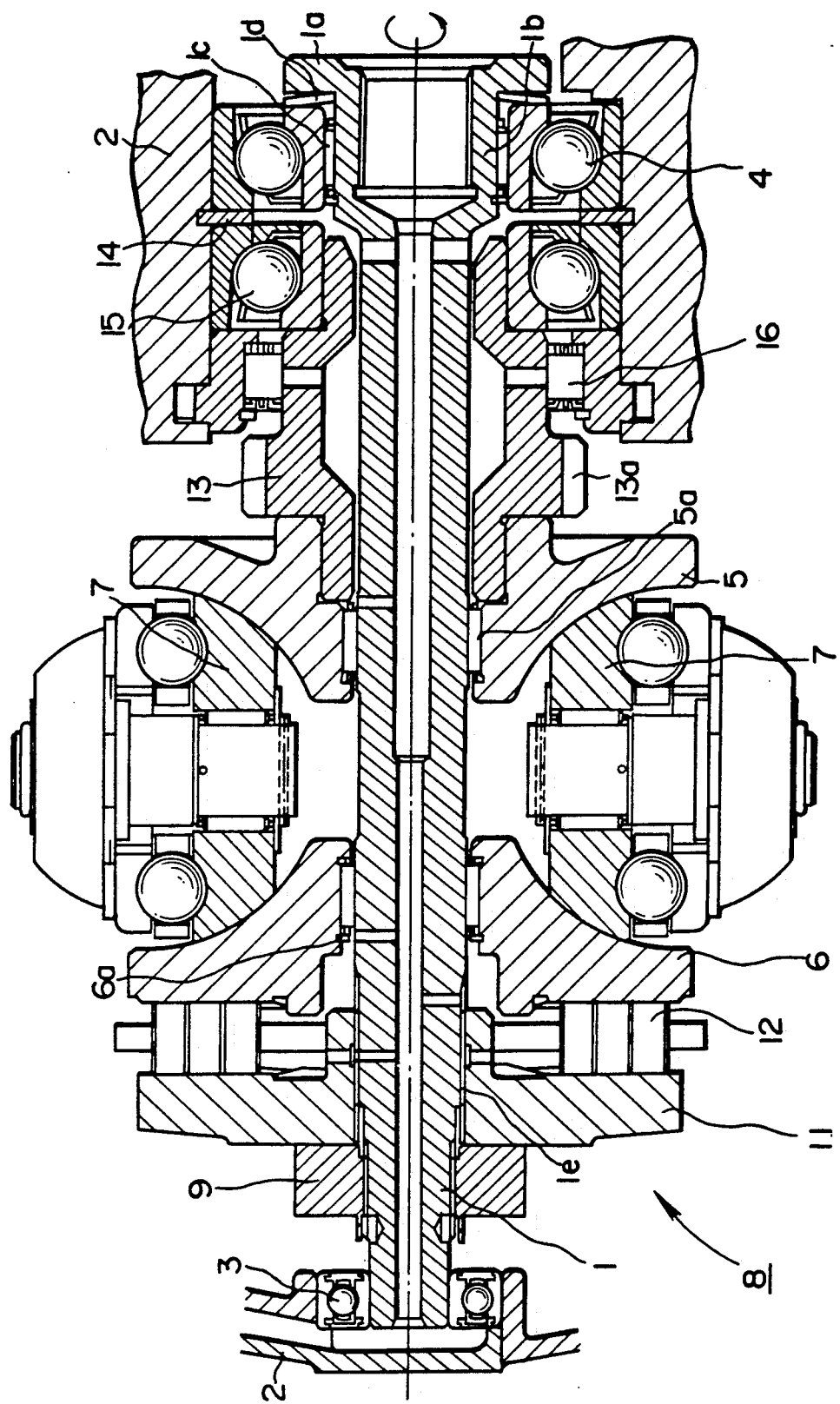
FIG. 1 is a cross sectional view illustrating a first embodiment of the invention.

With reference to FIG. 1, an input shaft 1 is rotatably supported at opposite ends thereof by a deep-groove ball bearing 3 and an angular ball bearing 4 which are secured to a housing 2. The outer peripheral surface of the input shaft 1 and the inner peripheral surface of an inner race of the deep-groove ball bearing 3 are clearance fitted, and the input shaft 1 is allowed to slide in the axial direction. The input shaft 1 is formed at a right end with a large diameter portion 1b having a flange 1a. The large diameter portion 1b is connected to an output shaft (not shown) of an engine through, for example, a clutch. Furthermore, a needle-shaped roller bearing 1c is interposed between the outer peripheral surface of the larger diameter portion 1b and the inner peripheral surface of an inner race of the roller bearing 4. A pressure adjusting Belleville washer 1d as a pressure adjusting elastic member is interposed between a left end face of the flange 1a and a right end face of the inner race of the roller bearing 4. Thus, the input shaft 1 is biased to the right by the pressure adjusting Belleville washer 1d.

An output disk 5 is rotatably disposed on the input shaft 1 through a needle-shaped roller bearing 5a at a substantially right end position of an intermediate portion of the input shaft 1. Similarly, an input disk 6 is rotatably disposed on the input shaft 1 through a needle-shaped roller bearing 6a at a left position opposing the output disk 5 with a predetermined interval therebetween. Power rollers 7 are rollably and tiltably in contact with toroidal surfaces formed on opposing surfaces of both the input and output disks 5 and 6.

A pressing mechanism 8 is disposed on the input shaft 1 at the left of input disk 6 so as to apply a predetermined pressing force between the input disk 6 and the power rollers 7 and between the output disk 5 and the power rollers 7.

The pressing mechanism 8 includes the pressure adjusting Belleville washer 1d and the needle-shaped roller bearing 1c, and is also provide with a loading nut 9 screwed around the input shaft 1, a loading cam 11 which directly abuts the loading nut 9, and a roller 12 which is rollably in contact with cam surfaces respectively formed on the loading cam 11 and a left end face of the input disk 6.

On the other hand, the output disk 5 is integrally connected to a left end of a cylindrical member 13 into which the input shaft 1 is inserted. A right end of the cylindrical member 13 is rotatably supported by a bearing 15 which is provided in the housing 2 side by side with the bearing 4 and interposed by a snap right 14 as a stopper. Furthermore, the cylindrical member 13 is formed with an outer peripheral surface having a tooth portion 13a which engages a gear formed in the output shaft (not shown). A one-way brake 16 is interposed between the outer peripheral surface of the cylindrical member 13 and the housing 2.

Next, the operation of the first embodiment will be described. Supposing that no input torque is transmitted to the input shaft 1 form the external rotation drive, in this condition, the input shaft 1 is in a rotation stopped condition and is biased to the right in the axial direction by the pressure adjusting Belleville washer 1d interposed between the flange 1a and the bearing 4. As a result, the biasing force of the pressure adjusting Belleville washer 1d is transmitted to the input disk 6 through the input shaft 1, the loading cam 11 and the roller 12. At this time, on the part of the output disk 5, since the cylindrical member 13 which is integrally connected to the output disk 5 is supported by the bearing 15 and limited in its movement to the right in the axial direction, a predetermined pressing force is exerted between the output disk 5 and the power rollers 7 and between the input disk 6 and the power rollers 7.

From this rotation stopped condition, when a relatively small input torque is transmitted to the input shaft 1 from the rotation drive, the input shaft 1 is rotated, and its rotation force is transmitted to the loading cam 11 through a serration portion 1e, and further transmitted to the input disk 6 through the roller 12. Thus, the input disk 6 is rotated, and this rotation force is transmitted to the output disk 5 through the power rollers 7, and further transmitted to the output shaft (not shown) from the tooth portion 13a of the cylindrical member 13.

From this low input torque rotation condition, when an input torque which produces thrust equal to or larger than the pressing force caused by the spring force of the pressure adjusting Belleville washer 1d is transmitted to the input shaft 1, a relative displacement is caused between the input disk 6 and the loading cam 11, and thus, the roller 12 intrudes between the cam surfaces formed on opposing surfaces of the input disk 6 and the loading cam 11. As a result, the loading cam 11 escapes to the left in the axial direction. However, since the loading cam 11 and the loading nut 9 are abutting each other, the input shaft 1 slides to the left against the pressure adjusting Belleville washer 1d. In this case, since the input shaft 1 and the deep-groove ball bearing 3 supporting the input shaft 1 at one end are clearance fitted, and at the same time, since the needle-shaped roller bearing 1c is interposed between the input shaft 1 and the angular ball bearing 4 supporting the other end of the input shaft 1, the frictional force encountered at the time of sliding of the input shaft 1 can be reduced to about 1/10 of the slide frictional force in the serration coupling in the prior art transmission.

Thereafter, when the input torque is further increased and the flange 1a completely abuts the angular ball bearing 4 sandwiching the pressure adjusting Belleville washer 1d therebetween, the sliding movement of the input shaft 1 to the left is restricted. From this time point, all of the thrust generated by cooperation of the roller 12 with the cam surfaces formed between the input disk 6 and the loading cam 11 is transmitted to the input disk 6. Accordingly, it is possible to apply a large pressing force between the input disk 6 and the power rollers 7 and between the output disk 5 and the power rollers 7 in accordance with the input torque transmitted to the input shaft 1.

As described above in the first embodiment, in a transient condition from the generation of the pressing force by the spring force of the pressure adjusting Belleville washer 1d to the generation of the pressing force by the loading cam and the roller 12, it is designed that the input shaft 1 having a small slide resistance is slidingly moved. Therefore, it is possibly to correctly increase the thrust following an increase in the input torque, and to prevent a slip between the input disk and the loading cam reliably.

While in the first embodiment, the loading nut 9 and the loading cam 11 are constituted by separate members, both the members may be integrally formed.

Next, a second embodiment will be described with reference to FIG. 2.

In this second embodiment, the transmission is designed to reduce a slide resistance of a loading cam 11 with respect to an input shaft 1 by interposing a ball spline between the loading cam 11 and the input shaft 1.

Figure 2:
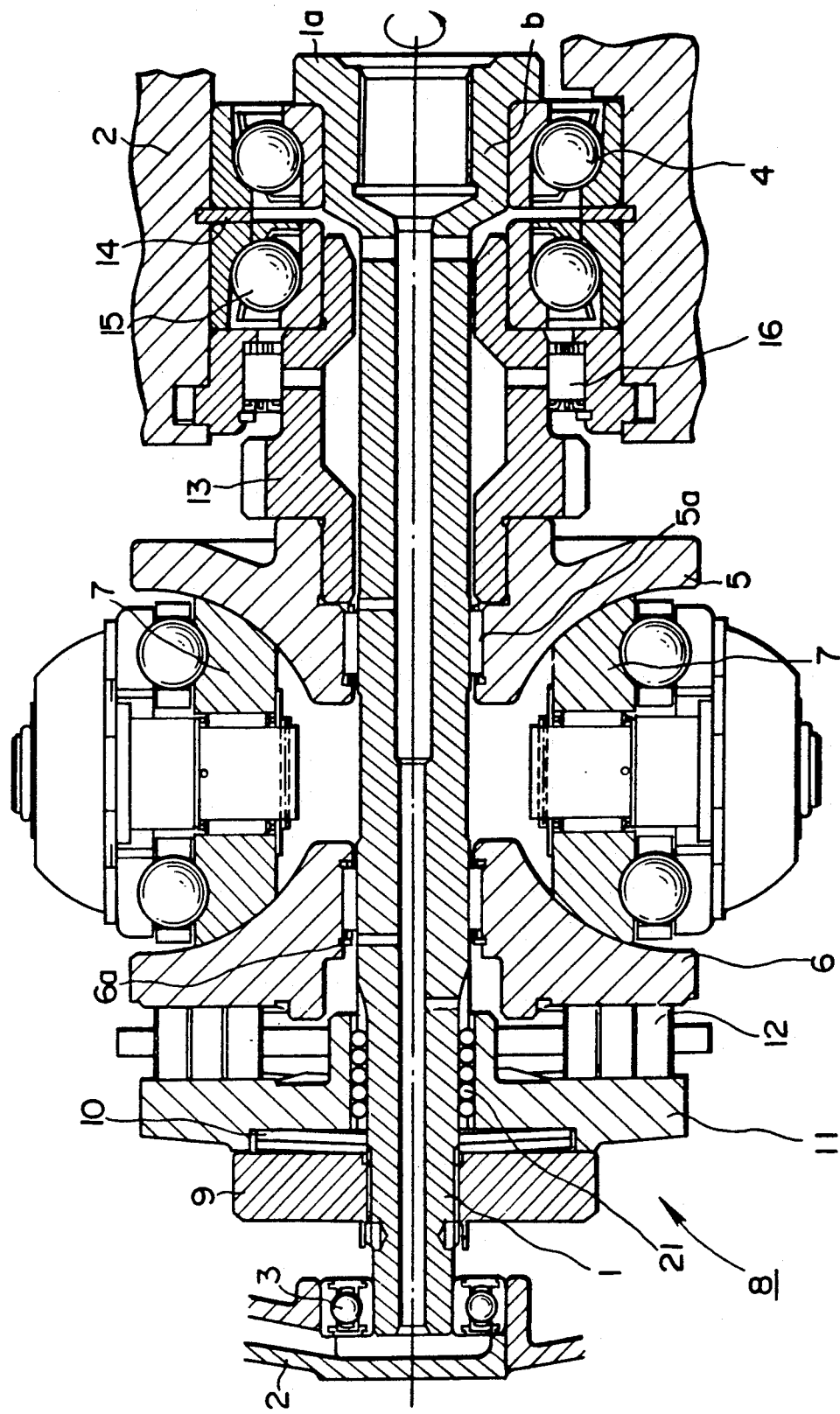
FIG. 2 is a cross sectional view illustrating a second embodiment of the invention.
Figure 3:
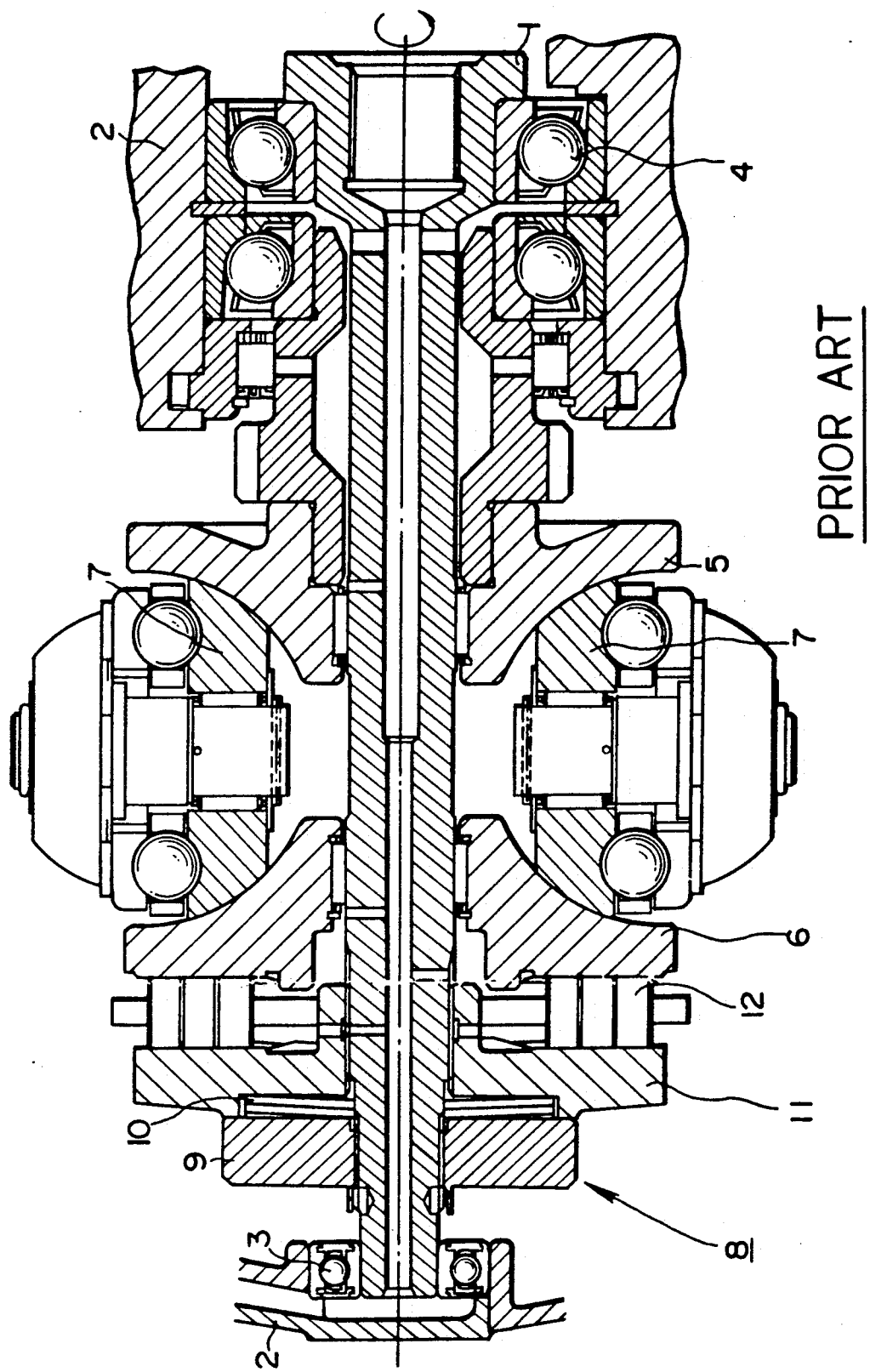
FIG. 3 is a cross sectional view illustrating a prior art example.

Specifically, in FIG. 2, corresponding parts to that shown in FIG. 1 are designated by identical reference numerals and detailed descriptions thereof are omitted. Further, the pressure adjusting Belleville washer 1d, the needle-shaped roller bearing 1c, and the serration coupling between the loading cam 11 and the input shaft 1 in FIG. 1 are omitted. Instead of these members, a ball spline 21 is interposed between the input shaft 1 and the loading cam 11, and at the same time, a pressure adjusting Belleville washer 10 is interposed between a loading nut 9 and the loading cam 11. The rest of the structure is the same as in FIG. 1.

In the second embodiment, in a condition in which no input torque is transmitted to the input shaft 1, since the flange 1a of the input shaft 1 abuts a right end face of an inner race of the angular ball bearing 4, a spring force of the pressure adjusting Belleville washer 10 is transmitted to the input disk 6 through the loading cam 11 and the roller 12. As a result, a relatively small pressing force is generated between the input disk 6 and the power rollers 7 and between the output disk 5 and the power rollers 7.

In this condition, when an input torque is transmitted to the input shaft 1 from a rotation drive, (not shown), in a range in which the input torque has a small value, the pressing force mentioned above is determined by the spring force of the pressure adjusting Belleville washer 10. However, when the input torque is increased, since the roller 12 intrudes between cam surfaces formed between the loading cam 11 and the input disk 6, the loading cam 11 is moved to the left against the spring force of the pressure adjusting Belleville washer 10 and the pressing force due to the pressure adjusting Belleville washer 10 is correspondingly increased. At this time, the loading cam 11 and the input shaft 1 are allowed to slidingly move in the axial direction by the ball spline 21. The loading cam 11 and the input shaft 1 are connected to form a unitary member with respect to the rotation direction. Accordingly, the frictional force of the loading cam 11 when it is slidably moved in the axial direction can be reduced to about 1/10 as compared with the prior art transmission, and the loading cam 11 can slide smoothly in the axial direction.

When the input torque is further increased so that the loading nut 9 abuts the loading cam 11, all of the pressing force generated by the action of the roller 12 on the cam surfaces formed between the loading cam 11 and the input disk 6 is applied between the input disk 6 and the power rollers 7 and between the output disk 5 and the power rollers 7 to thereby generate a large pressing force.

As described above, also in the second embodiment, the sliding movement of the loading cam can be smoothly performed in the case in which the pressing force between the input disk and the power rollers and between the output disk and the power rollers is generated by the pressure adjusting Belleville washer. At this time, since the frictional force becomes small, the transition from a pressing force generating condition by the pressure adjusting Belleville washer to a pressing force generating condition by the loading cam and the roller can be achieved correctly following a variation in the input torque, and the power transmission efficiency can be improved.

While in each of the embodiments described above it is described that the pressure adusting Belleville washer is used as a pressure adjusting elastic member, the present invention is not limited to this, and other elastic members, such as a coil spring, a leaf spring, rubber, etc., may be used.

As described in the foregoing, in the torodial-type infinitely variable transmisison in the one aspect of the invention, a pressure adjusting elastic member is interposed between the rotation drive side of the input shaft and the bearing supporting the input shaft, and a needle-shaped roller bearing is interposed between the inner peripheral surface of this bearing and the outer peripheral surface of the input shaft. Accordingly, in the transition from a condition in which the pressing force between the input disk and the power rollers and between the output disk and the power rollers is generated by an elastic force of the pressure adjusting elastic member to a condition in which the pressing force is generated by the action of the cam surfaces between the loading cam and the input disk, the loading cam does not slide at the serration coupling portion with the input shaft, and the input shaft moves slidingly with respect to the bearing. As a result, it is possible to reduce the frictional force to a great extent, and the slip which is caused between the loading cam and the input disk at the time of variation of the input torque can be prevented without failure. Thus, the efficiency and the reliability of the power transmission can be improved. Furthermore, an advantage is provided in that since there is no need to use a large elastic force of the pressure adjusting elastic member, the loss due to bearing friction can be reduced, and the service life of the bearing can be improved.

Furthermore, in the toroidal-type infinitely variable transmission in the other aspect of the invention, since the loading cam and the input shaft are coupled with each other by a ball spline, it is possible to reduce to a great extent the frictional force encountered when the loading cam slidingly moves at the time of transition from a condition in which the pressing force between the input disk and the power rollers and between the output disk and the power rollers is generated by the elastic force of a pressure adjusting elastic member to a condition in which the pressing force is generated by the action of cam surfaces between the loading cam and the input disk. Thus, the advantage similar to that in the first aspect of the invention can be obtained.

What is claimed is:

1. In a toroidal-type infinitely variable transmission comprising an input shaft having one end connected to a rotation drive, an output disk and an input disk successively disposed on said input shaft from a rotation drive side of said input shaft with a predetermined interval between said input disk and said output disk, power rollers rollably and tiltably disposed between said input disk and said output disk, and a pressing mechanism having a loading cam and disposed on said input shaft at a rear side of said input disk and having a pressure adjusting elastic member interposed between a flange of said input shaft formed at said rotation drive side thereof and an axial opposing surface of a bearing disposed at the rotation drive side of said input shaft for receiving an axial force of said input shaft, the improvement comprising:

a needle-shaped roller bearing disposed between said input shaft and said bearing receiving the axial force of said input shaft to allow said input shaft to slide in an axial direction with a reduced sliding resistance against a spring force of said elastic member when a thrust in an axial direction increases to thereby prevent slip between said loading cam and said input shaft.

* * * * *